United States Patent [19]
Takeda

[11] 4,200,294
[45] Apr. 29, 1980

[54] AUTOMATIC RECORD PLAYER CAPABLE OF CHANGING DISCS AUTOMATICALLY

[75] Inventor: Kenji Takeda, Ozu, Japan

[73] Assignee: Matsushita Electric Industrial Co., Ltd., Osaka, Japan

[21] Appl. No.: 937,426

[22] Filed: Aug. 28, 1978

[30] Foreign Application Priority Data

Aug. 29, 1977 [JP] Japan .................. 52-103934

[51] Int. Cl.² .......................................... G11B 17/16
[52] U.S. Cl. .............................................. 274/10 R
[58] Field of Search ........................... 274/10 R, 10 S

[56] References Cited

U.S. PATENT DOCUMENTS

| | | | |
|---|---|---|---|
| 3,507,503 | 4/1970 | Freier | 274/10 R |
| 3,820,797 | 6/1974 | Suzuki et al. | 274/10 S |

FOREIGN PATENT DOCUMENTS 1162590  2/1964  Fed. Rep. of Germany ......... 274/10 S

*Primary Examiner*—John W. Shepperd
*Attorney, Agent, or Firm*—Stevens, Davis, Miller & Mosher

[57] ABSTRACT

Provided is an automatic record player capable of changing discs automatically. The record player includes a spindle having holder claws for holding the record disc and a large gear adapted to be rotated in accordance with the rotation of the turn table of the player and to move the pickup of the player. The large gear is provided with a first cam groove for continuing the playing and a second cam groove for ceasing the playing, and a switching member adapted to guide a guide pin of a pickup driving member selectively to either one of the cam grooves. The switching member in turn is adapted to be controlled by a switching controlling member. The switching controlling member is adapted to be engaged, when at least a record disc is held by said holder claws, by a spindle shaft which has been lowered due to the weight of the disc to a predetermined lowered position, and biases the switching member so as to make the latter guide the guide pin of the driving member into the cam groove for continuing the playing. To the contrary, when there is no disc carried by the holder claws, the switching controlling member is not engaged by the spindle shaft, because the latter is not lowered, so that it is moved to an inoperative position where it biases the switching member such that the guide pin of the pickup driving member into the cam groove for ceasing the playing.

2 Claims, 6 Drawing Figures

AUTOMATIC RECORD PLAYER CAPABLE OF CHANGING DISCS AUTOMATICALLY

BACKGROUND OF THE INVENTION

The present invention relates to an automatic record player changer and, more particularly, to an automatic record player having a so-called umbrella type spindle in which holder claws for holding record discs are adapted to retract into and extend out of a slit formed in the spindle body through up and down movement of a spindle shaft accommodated in the spindle body.

The invention aims at providing an automatic record player of this kind in which the construction thereof is simplified without being accompanied by a substantial degradation of reliability, so as to facilitate assembly and reduce manufacturing costs.

Generally speaking, changer type automatic record players are arranged such that playing continues as long as discs are set on the spindle and playing automatically stops when there are no more discs on the spindle. Various experiments and developments have been made to this end. Among many proposals which have been made concerning the technique for controlling the operation of the player upon detection of the presence of a disc on the spindle, an apparatus disclosed in Japanese Patent Publication No. 30441/74 is considered superior because of its simple construction. This apparatus has a spindle assembly consisting of a spindle body, a spindle shaft adapted to move up and down within the spindle body, holder claws adapted to retract into and extend out of the spindle body through slits formed in the latter, by the up and down movement of the spindle shaft, so as to hold and drop the record disc inserted onto the spindle. The spindle shaft is provided in its lower peripheral portion with a groove which is exposed on the spindle body when the spindle shaft has been lowered by a predetermined distance. Disposed beneath the spindle assembly are a lever adapted to be swung up and down by a driving mechanism and to make contact, when swung up, with the lower end of the spindle shaft so as to move the latter upward, and a hook pivotally mounted to the lever and adapted to engage the groove formed in the lower portion of the spindle shaft, when the lever is lowered by a predetermined distance together with the spindle shaft.

As the lever is lowered while the disc is held by the holder claws, the holder claws and the spindle shaft are lowered by a predetermined distance due to the force of gravity so that the groove formed in the lower peripheral portion of the spindle shaft appears from the lower end of the spindle body, and is engaged by the hook pivotally mounted to the lever. As the lever is further lowered, the holder claws and the spindle shaft are pulled by the hook and moved downward beyond the above-mentioned predetermined distance so that the holder claws are retracted into the spindle body through the slits. Consequently, the disc which has been held by the holder claws drops onto the turn table. However, if there is no disc held by the spindle, the holder claws and the spindle shaft are not lowered substantially, even after the lowering of the lever, because no weight of the disc is applied to the holder claw. Consequently, the hook pivots freely apart from the lower end of the spindle, and the changing operation of the player can be automatically and completely stopped by the rotation of this hook.

This apparatus, however, involves the following problem.

Namely, in order to attain the effective operation of automatic mechanisms for continuing or stopping the playing, this apparatus requires a sufficiently high precision of design and assembly, so as to obtain for example, the precise up and downward movement of the spindle shaft, the exact position of the groove, the suitable position of the hook on the lever and so forth. For this reason, no reliable operation can be expected by which such an apparatus may be used in practice.

SUMMARY OF THE INVENTION

It is therfore an object of the invention to provide an automatic record player different from the prior art which has an reliability and easy to assemble, thereby overcoming the problems exhibited by the prior art.

To this end, according to the invention, there is provided an automatic record player having a cylindrical spindle body, a spindle shaft received in the spindle body for free up and down movement and holder claws adapted to come in and out of the spindle body through slits formed in the spindle body, through movement of the spindle shaft, thereby downward and upward, to drop one of the record disc carried by the spindle body and to hold the other discs in place, characterized by comprising a large gear operatively connected to a turn table so as to be rotated as the latter is rotated, a first cam groove for holding the playing operation and a second cam groove for stopping the playing operation, the first and second cam grooves being formed in the large gear, a driving member adapted to be selectively engaged by the cam grooves and adapted to be moved reciprocatively to shift the position of a pickup as the large gear is rotated, a switching member provided on the large gear and adapted to force the driving member into engagement with either one of the two cam grooves, and a switching controlling member adapted to switch the switching member to a position for causing the driving member to engage the first cam groove, wherein the switching controlling member is adapted to be engaged and held by the spindle shaft lowered by a predetermined distance when at least one disc is carried by the holder claws of the spindle shaft so as to allow the driving member to engage the first cam groove, whereas, when no disc is held by the holder claws, the switching controlling member is not engaged by the spindle shaft which is held at the raised position, so as to be moved to an inoperative position, thereby to allow the driving member to engage the second cam groove.

These and other objects, as well as advantageous features of the operation will become clear from the following description of the preferred embodiments taken in conjunction with the accompanying drawings.

DESCRIPTION OF THE PREFERRED EMBODIMENTS

Before turning to the description of the preferred embodiment of the invention, a description will be made hereinunder as to an automatic record player as shown in Japanese Patent Publication No. 30441/74, which is the prior art of the invention, with specific reference to FIGS. 1 to 3, in order to facilitate the understanding of the invention.

Figure 1:
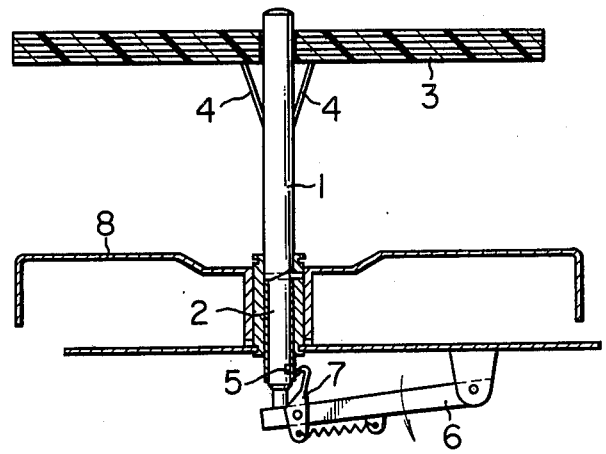
FIG. 1 is a schematic sectional front elevational view of a conventional automatic record player.

As shown in FIG. 1, this apparatus has a spindle assembly consisting of a spindle body 1, a spindle shaft 2 adapted to move up and down within the spindle body, holder claws 4 adapted to retract into and extend out of the spindle body 1 through slits formed in the latter through the up and down movement of the spindle shaft 2 so as to drop one of the record discs 3 inserted onto the spindle and hold the other discs in place. The spindle shaft 2 is provided in its lower peripheral portion with a groove 5 which is exposed on the spindle body when the spindle shaft has been lowered by a predetermined distance. Disposed beneath the spindle assembly, are a lever 6 adapted to be swung up and down by a driving mechanism and to contact when driven upward, the lower end of the spindle shaft, so as to move the latter upward, and a hook 7 pivotally mounted to the lever and adapted to engage the groove formed in the lower portion of the spindle shaft, when the lever is lowered by a predetermined distance together with the spindle shaft.

Figure 2:
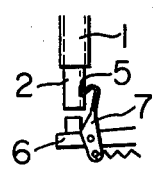
FIGS. 2 and 3 are illustrations for explaining the operation of the player as shown in FIGS. 2 and 3.
Figure 3:
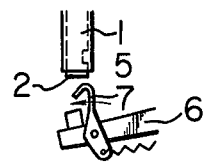

As a lever 6 is lowered while the disc is held by the holder claws, the holder claws and the spindle shaft 2 are lowered by a predetermined distance due to the weight of the disc 3, so that the groove 5 formed in the lower peripheral portion of the spindle shaft 2 appears from the lower end of the spindle body 1 as shown in FIG. 2, and is engaged by the hook 7 pivotally mounted to the lever 6. As the lever 6 is further lowered, the spindle shaft 2 is pulled by the hook and moved downward beyond the above-mentioned predetermined distance so that the holder claws 4 are retracted into the spindle body 1 through the slits. Consequently, the disc 3 which has been held by the holder claws 4 drops onto the turn table. However, if there is not disc retained on the spindle 1, the holder claws 4 and the spindle shaft 2 are not lowered substantially, even after the lowering of the lever 6, because no weight of a disc is applied to the holder claws 4. Consequently, the hook 7 swings apart from the lower end of the spindle, and the changing operation of the player can be automatically and completely stopped by the swing of this hook 7.

This apparatus, however, involves the following problem.

Namely, this apparatus requires, in order to attain the efficient reliable operation of automatic mechanisms for continuing or stopping the playing, an impractically high precision of design and assembly, thereby obtaining for example, the precise up and downward stroke of the spindle shaft 2, the exact positioning of the groove 5, the suitable positioning of the hook 7 on the lever 6 and so forth. For this reason, no reliable operation which causes such an apparatus to be practically used, can be expected.

Figure 4:
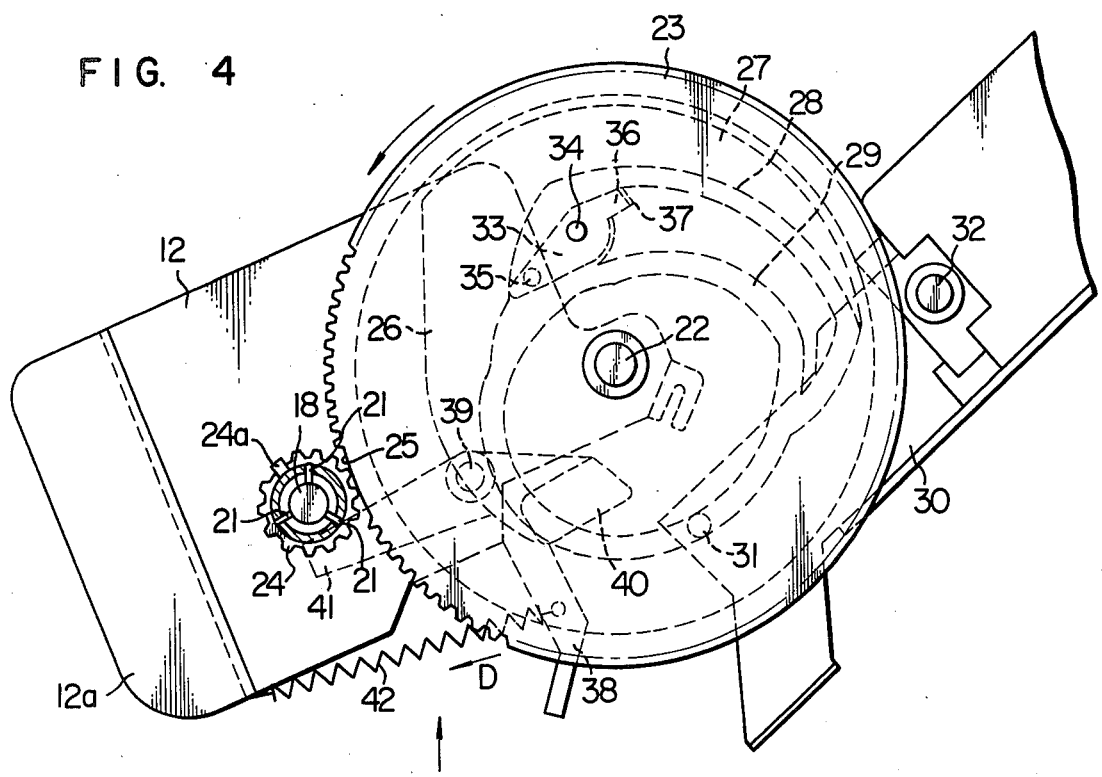
FIG. 4 is a plan view of an automatic record player embodying the present invention.
Figure 5:
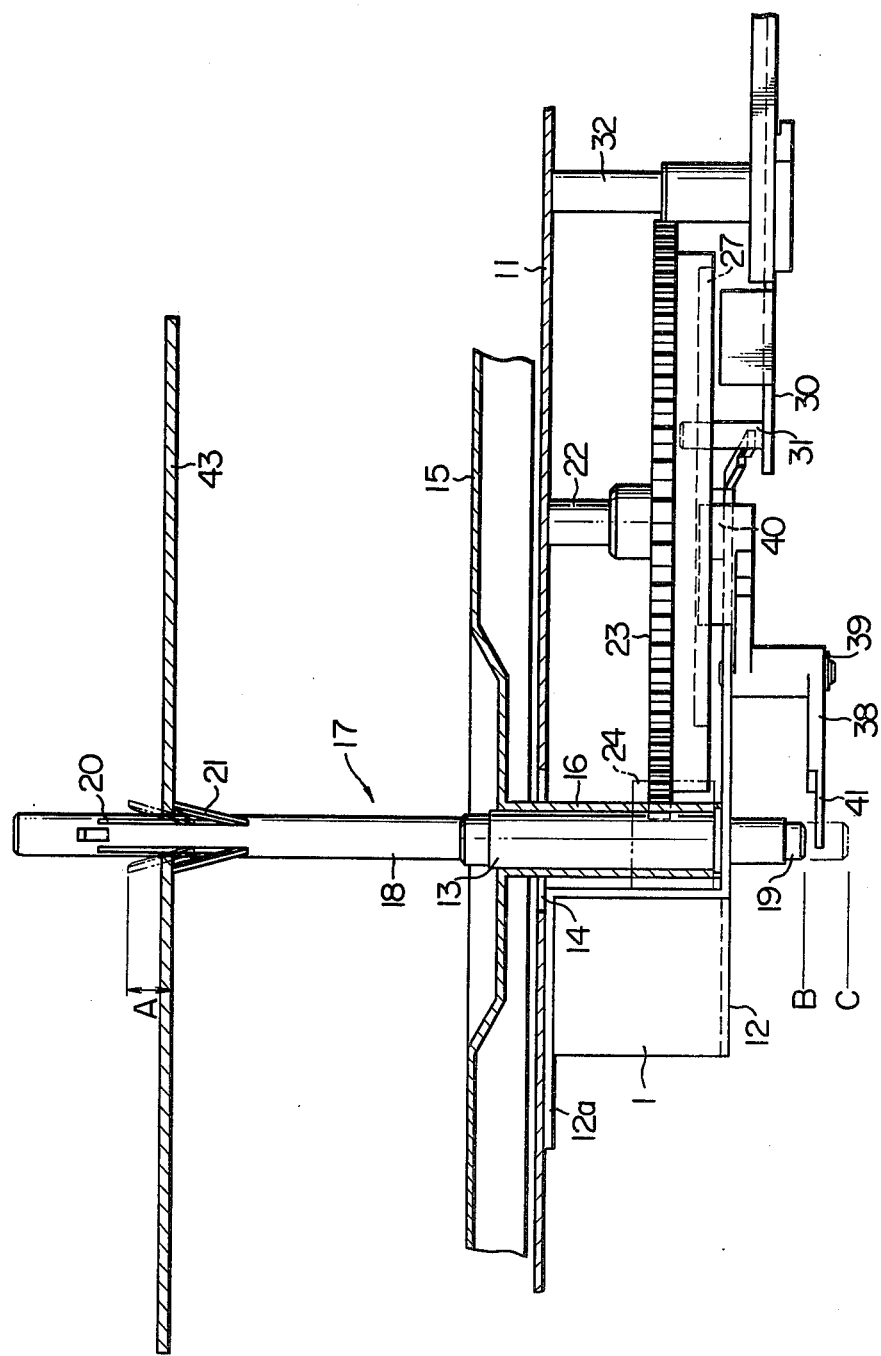
FIG. 5 is a front elevational sectional view of the record player as shown in FIG. 4.

Hereinafter, a practical embodiment of the invention will be described with reference to the drawings. Referring to FIGS. 4 and 5, a reference numeral 11 denotes an upper plate of a cabinet. A base plate 12 has a fixture 12a attached to the lower side of the upper plate 11. A cylindrical turn table shaft 13 is fixed at its lower end to the base plate 12 and projects upwardly through an aperture 14 formed in the upper plate 11. A turn table 15 is rotatably mounted onto this turn table shaft 13, and has a journal hearing 16. The turn table 15 can be withdrawn from the shaft 13 by pulling it upward. An umbrella type spindle assembly 17 is received in the turn table shaft 13, and is projected downward through an aperture (not shown) formed in the base plate 12. This spindle assembly 17 has a cylindrical spindle body 18, a spindle shaft 19 received in the spindle body 18 for free up and downward movement, and holder claws 21. The holder claws are usually projected outward through the slits formed in the spindle body 18, and retracted into the spindle body 18 as the shaft 19 is moved downward. The up and downward movement of the spindle shaft 19 is caused by a well known mechanism which may be, for example, the same mechanism as used in the prime art apparatus shown in FIGS. 1 to 3.

A shaft 22 is fixed between the upper plate 11 and the base plate 12, while a large gear 23 is rotatably secured to the shaft 22. A reference numeral 24 denotes a small gear fixed to the lower end of the journal 16 of the turn table 15, so as to drive the large gear 23. The large gear 23 has a peripheral portion 25 where no gear teeth are formed.

The arrangement is such that large gear 23 is not driven when the small gear 24 is opposed by the portion 25 having no gear teeth. However, when , a manual lever (now shown) is turned to the starting side for starting the playing, or to the stopping side for stopping the playing midway of the playing, or when the pick up is driven into the innermost groove in the disc due to the completion of the playing, a link mechanism (not shown) on the large gear 23 is engaged by a projection 24a of the small gear 24 so that the large gear is slightly moved to come into engagement with the small gear 24. Consequently, the large gear 23 is driven by the small gear 24, and stops when the portion 25 having no teeth is again brought in opposition to the small gear 24, after making one full turn. This mechanism for causing the operation of the large gear 23 is well known and, therefore, further description concerning this mechanism is omitted.

A recess 27 having an inner peripheral wall constituting a cam 26 is formed in the lower surface of the large gear 23. A pair of cam grooves 28, 29 are formed in the bottom of this recess 27 which have a common portion. One of the cam grooves 28 of these cams serves for continuing the playing operation, i.e. for returning the pickup to the starting position when the playing of a record disc on the turn table 8; is completed operation, while the other 29 serves to stop the playing, i.e. for moving the pickup to the position on the arm rest after the completion of the playing of the record disc, thereby to stop the playing. These cam grooves are adapted to receive a hub 31 of a driving plate 30 by which the pickup is moved automatically. The driving plate 30 is suitably supported on the upper plate 11 by means of a shaft 32, and is adapted to oscillate in accordance with the rotation of the large gear 23.

Figure 6:
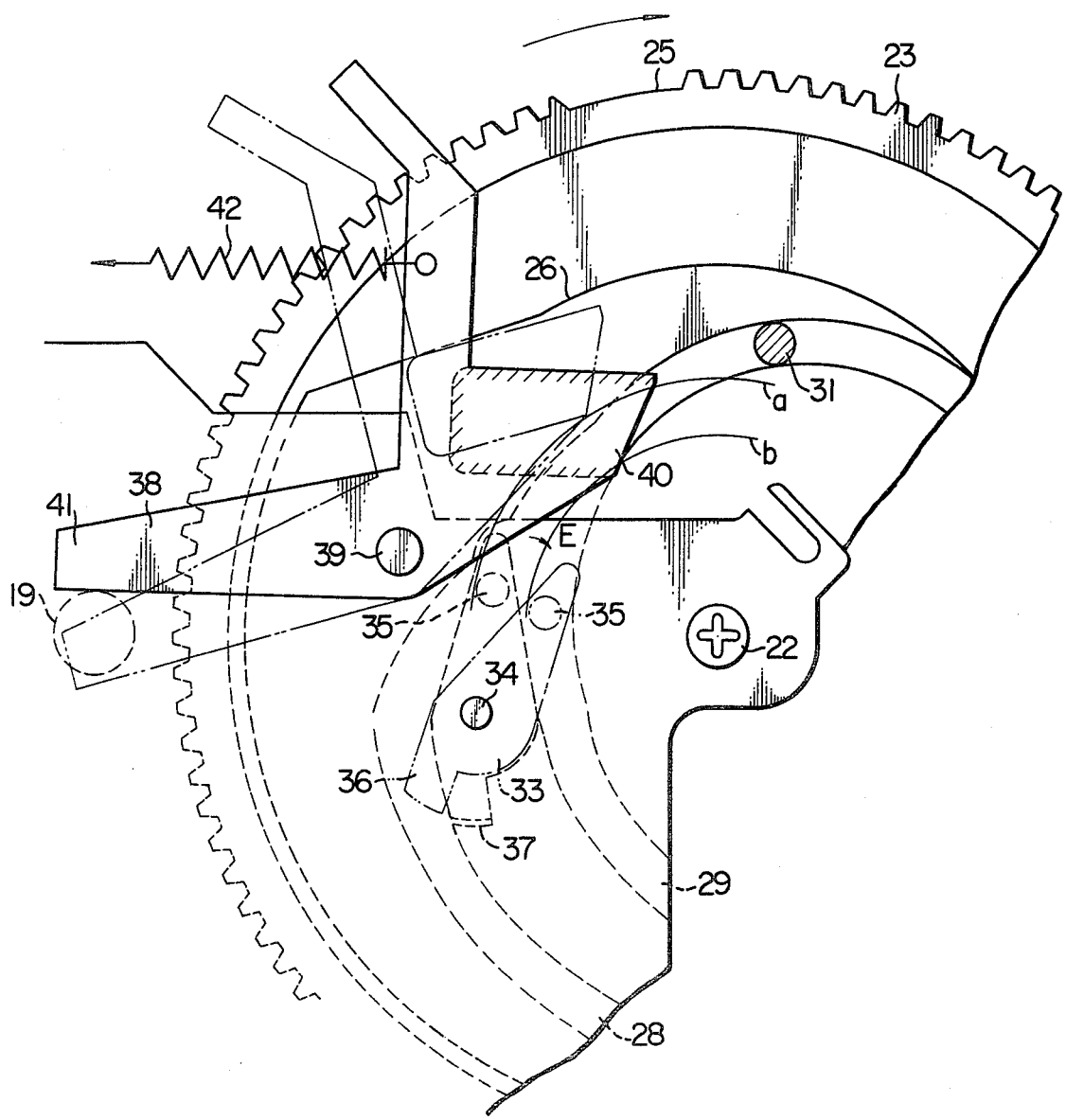
FIG. 6 is an illustration for explaining the operation of the player.

Returning again to the large gear 23, a switching member 33 is pivoted by a shaft 34 to the inlet side portion where the cam groove for continuing the playing operation joins the cam grooves for stopping the playing operation. Grease or the like is applied to this switching member 33 so that it may not be accidentally rotated simply by external vibration or the like. The switching member 33 is provided at its one end with a pin 35 and at its other end with an engaging piece 36. Curves a and b in FIG. 6 show the paths of movement of the pin 35 caused by the rotation of the large gear 23. The engaging piece 36 is adapted to engage with an engaging portion 37 formed on the bottom of the recess 27 of the large gear 23. When the engaging piece 36 is brought to a position engageable with the engaging portion 37 the leading end of the cam groove 28 is closed, so that the hub 31 of the driving plate 30 is moved along the cam groove 29 to stop the playing operation. To the contrary, when the engaging piece 36 is rotated to a position spaced from the engaging portion 37, the leading end of the cam groove 29 is closed so that the hub 31 of the driving plate 30 is moved along the cam groove 28 for continuing the playing operation.

A switching controlling member 38 rotatably attached through a shaft 39 to the lower side of the base plate 12 is adapted to control the rotation of the switching member 33 to and from the position where it closes the cam groove 29 for stopping the playing operation.

The switching controlling member 38 is provided at its one end with a cam portion 40 for engaging the inner peripheral cam wall 26 of the recess 27 of the large gear 23. The other end of the switching controlling member 38 constitutes an arm portion 41 which extends to the lower side of the spindle 17. A tension spring 42 stretched between the base plate 12 and the switching controlling member 38 is adapted to rotatively bias the latter such that the cam portion 40 is kept in contact with the inner peripheral cam wall 26 of the recess 27 in the large gear 23. In FIG. 5, reference numeral 43 denotes a record disc.

Hereinafter, the operation of the record player of the invention having the described construction will be explained. An assumption is made here that a record disc 43 is on the spindle 17. As the large gear 23 starts rotating in the direction of the arrow under power transmitted from the turn table 15 through the small gear 24; a lever (not shown) having a projection through which the spindle shaft 19 of the spindle 17 has been raised is lowered so that the holder claws 21 are lowered by a distance A, due to the weight of the disc 43. Consequently, the spindle shaft 19 carrying the holder claws 21 is lowered from a position B to a lower position C. The switching controlling member 38, which tends to rotate in the direction of an arrow D along the inner peripheral cam wall 26 of the large gear 23 as the latter rotates, is held against the rotation at a position where the arm portion 41 abuts the spindle shaft 19 which has been lowered. The switching controlling member 38 can be kept in this position manually, even when no disc is carried by the spindle 17. This manual operation is made by turning the manual operation lever to the starting side, so that the boss (not shown) of the lever holds the switching controlling member 38 in the same condition.

As the large gear 23 is further rotated in the direction of the arrow, the pin 35 of the switching member 36 comes into contact with the wall of the cam portion 40 of the switching controlling member 38 so that the switching member 33 is moved in the direction of an arrow E, thereby closing the leading side end of the cam groove 29 to stop the playing operation. Then, the hub 31 of the driving plate 30 is guided by the cam groove 28 for continueing the playing, while the driving plate 30 oscillates once. As a result of this movement of the driving plate 30, the pickup is returned to the position on the arm rest, after the playing operation is over. The pickup is then moved to the starting position on a new disc which has dropped onto the turn table so that the playing is started on the new disc.

After having passed over the cam portion 40 of the switching controlling member 38, the engaging piece 36 of the switching member 33 abuts against the hub 31 of driving plate 30, when the hub 31 passes the cam groove 28 so as to be returned to the initial state in which it closes the cam groove 28 to continue the playing operation.

When all the discs on the spindle 17 have dropped, or when the manually operable lever is turned to the stopping side midway of the playing operation, the spindle shaft 19 is not lowered but is held at the position B. In this state, the arm portion 40 of the switching controlling member 39 does not abut the spindle shaft 19 but is rotated to the position as shown by two-dots-and-chain line.

In this state, the cam portion 40 of the switching controlling member 38 is out of the locus of revolution of the pin 35, so that the switching member 33 guides the hub 31 of the driving plate 30 to the cam groove 29 to stop the playing operation without interference by the cam portion 40 of the switching controlling member 39. Consequently, the driving plate 30 is moved to reset the pickup at its rest position on the arm rest, thereby to stop the playing operation.

As has been described, according to the invention, the mechanism for judging whether the playing is to be continued or stopped, upon detection of the presence of the disc on the spindle, is simplified and, without deteriorating the reliability of operation.

What is claimed is:

1. An automatic record player changing mechanism comprising:
   a base plate;
   a cylindrical shaft fixed to said base plate;
   a turn table rotatably mounted onto said cylindrical shaft;
   a cylindrical spindle body received in said cylindrical shaft and having a plurality of axial slits circumferentially spaced in a portion above said turn table;
   a spindle shaft arranged to move up and down within said cylindrical spindle body;
   a plurality of holder claws projecting through said axial slits for carrying record discs, said holder claws being rectractable into said cylindrical spindle body to drop one of the record discs onto said turn table when said spindle shaft moves downwardly;
   a large gear rotatable mounted to said base plate;
   means for selectively engaging said large gear with said turn table causing one complete revolution of said large gear;
   a first cam groove for controlling the continuation of a record playing operation formed in said large gear;
   a second cam groove for controlling the cessation of a record playing operation formed in said large gear;
   a common inlet portion formed in said large gear for said first and second cam grooves;
   a driving member pivotally mounted to said base plate, and having a hub arranged to be selectively guided along either one of said first and second cam grooves to shift a pickup arm when said large gear is rotated;

a switch member pivotally mounted to said large gear in said inlet portion for selectively opening either one of said first and second cam grooves and guiding said hub into either one of said first and second cam grooves;

a switch control member for switching said switch member once for one complete revolution of said large gear, said switch control member being movably mounted to said base plate for swinging movement in a plane substantially perpendicular to the movement of said spindle shaft, said switch control member engaging with said spindle shaft on its swinging movement when said spindle shaft has been moved down a predetermined distance by at least one record disc being carried on said holder claws to force said switch member to open said first groove for continuing a playing operation;

a cam surface formed in said large gear; and, means for biasing said switch control member to cooperate with said cam surface so that said switch control member reciprocally swings upon one complete revolution of said large gear, said biasing means being connected between said base plate and said switch control member.

2. An automatic record player as claimed in claim 1, wherein said switch member is provided at its one end with a pin and at its other end with an engaging piece, said engaging piece being arranged to abut said hub once in one complete revolution of said large gear so as to reset said swich member to a position wherein said first cam groove for continuing a playing operation is closed, and when said spindle shaft has been moved down said predetermined distance, said pin being engaged with said switch control member once in one complete revolution of said large gear so as to switch said switch member to open said first cam groove for continuing a playing operation, said pin not engaging with said switch control member when said spindle shaft is not moved down said predetermined distance as said switch control member swings across the passage of said spindle shaft without being engaged by said spindle shaft.

* * * * *